May 4, 1965  K. J. LEUFVENIUS  3,181,266
FISHING KITE
Filed Nov. 1, 1961
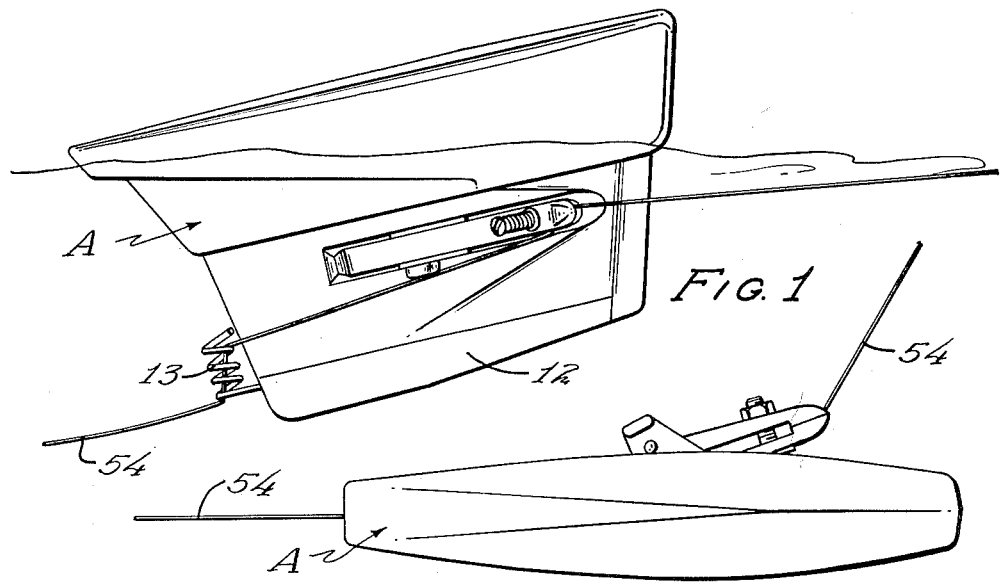
FIG. 1
FIG. 2
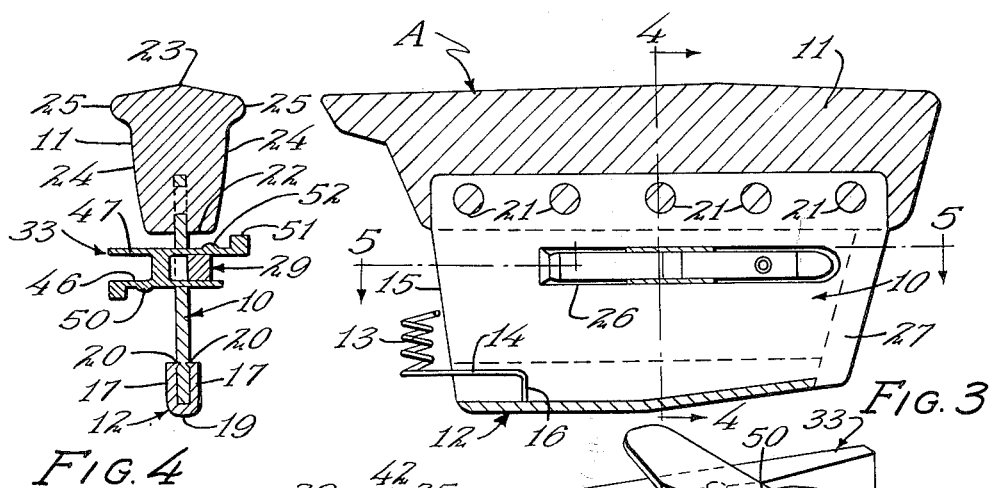
FIG. 3
FIG. 4
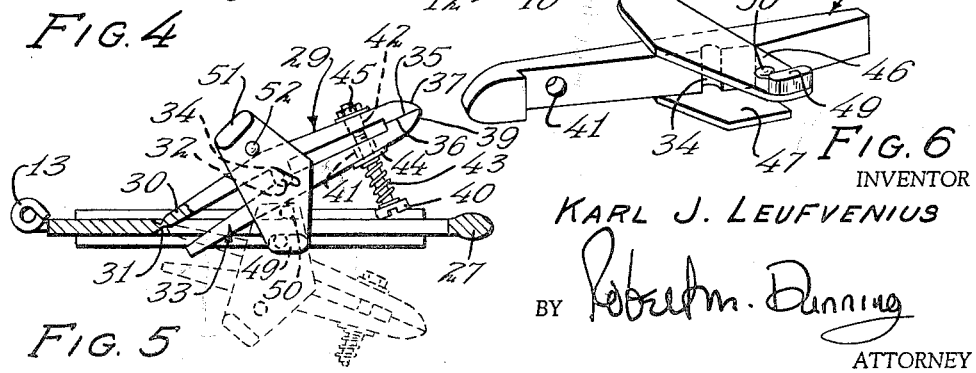
FIG. 5
FIG. 6
INVENTOR
KARL J. LEUFVENIUS
BY Robert M. Dunning
ATTORNEY

United States Patent Office 3,181,266
Patented May 4, 1965

3,181,266
FISHING KITE
Karl J. Leufvenius, Minneapolis, Minn., assignor to Development Diversified, Inc., a corporation of Minnesota
Filed Nov. 1, 1961, Ser. No. 149,259
9 Claims. (Cl. 43—43.13)

This invention relates to an improvement in fishing kite and deals particularly with an apparatus for directing a fishing line to one side or to the other of the path of movement of a boat from which the line is supported.

In certain types of fishing, it is desirable that the fishing line be guided well to one side of the path of movement of the boat or to the other. For example, if several persons are trolling from the same boat, it is desirable that the lines be spaced wide apart to prevent any danger of tangling. The present invention resides in the provision of a simple and effective fishing kite which tends to move in a direction generally parallel to the line of travel of the boat, but spaced a material distance laterally therefrom. Accordingly, the fishing line which extends to the bait is materially spaced to one side or the other of the path of movement of the boat.

A feature of the present invention resides in the provision of a simple device which may be formed in a small number of parts and which may be assembled at the very low cost of production. As a result, the device may be produced at a relatively low cost and yet will be extremely effective for its intended purpose.

A further feature of the present invention resides in the provision of a fishing kite which may be made to travel along a path on either side of the path of travel of the boat as desired. As a result, the same apparatus may be employed for trolling on the port side of the boat as on the starboard side.

A further feature of the present invention resides in the provision of a fishing kite which includes a member through which the fishing line extends so that the apparatus remains attached to the fishing line. The line is adjustably clamped between a pair of clamping arms, the arms extending in angular relation to the guiding fin and keel. Under normal circumstances, the kite is drawn through the water by the portion of the line which extends to the moving boat. However, when a fish exerts a pull upon the bait which is drawn behind the kite, the fisherman exerts a pull upon the line, jerking the line from between the clamping arms. The kite is then held to the line only by the member of the rear of the kite through which the line may move freely. As a result, the kite may slide freely longitudinally of the line toward the bait without interfering with the reeling of the line, and the fish may be reeled in in the conventional manner.

A further feature of the invention lies in the fact that the kite may be used to simplify fishing from the bank of a stream of flowing water. By threading the line through the guide at the rear of the kite, and clamping the line between the clamping arms extending angularly from the kite, the current of the stream will draw the kite away from the shore and hold the bait downstream from the kite. Thus a person may effectively fish from the shore of a river or stream with the bait being supported at a desired distance from the river bank.

In the drawings forming a part of the specification:

FIGURE 1 is a side elevational view of the fishing kite in operation.

FIGURE 2 is a top plan view of the kite.

FIGURE 3 is a longitudinal vertical section through the kite showing in general the arrangement of parts therein.

FIGURE 4 is a transverse vertical section through the kite, the position of the section being indicated by the line 4—4 of FIGURE 3.

FIGURE 5 is a horizontal sectional view through the lower portion of the kite, the position of the section being indicated by the line 5—5 of FIGURE 3.

FIGURE 6 is a perspective view showing the detachable clamping arm.

In its preferred form, most of the parts of the fishing kite A are integrally connected together so as to minimize the assembly operation. In general, the apparatus includes a vertical stabilizing fin 10, a lighter-than-water supporting float body 11, and a keel 12. The supporting float 11 is of proper size and proportion to support the apparatus on the surface of the water. The stabilizing fin 10 is designed to draw the device on a generally straight path through the water, while the stabilizing keel 12 is designed to hold the stabilizing fin 10 in a generally upright direction.

The fin 10 comprises a generally flat blade of relatively stiff but resilient plastic material such as that known as polypropylene. The fin 10 is generally trapezoidal in outline as viewed in side elevation, being somewhat longer at the top than along the lower edge. An open helical coil 13 formed of wire which is resistant to rusting and corrosion is provided with a generally L-shaped shank 14 which is embedded in the rear end 15 of the fin 10, the shank 14 having an angularly turned end 16 which holds the coil 13 firmly attached to the fin 10. As indicated in FIGURE 4, the keel 12 comprises a member of metal or similar material which has a substantially greater specific gravity than water. The keel 12 is generally U-shaped in cross section including spaced generally parallel sides 17 connected by a rounded connecting portion 19. The upper edges of the sides 17 are swaged or inwardly kerfed as indicated at 20 so that the keel is firmly engaged on the fin 10. The keel may be attached during the operation of molding the fin 10 or may be pressed into position to extend along the lower edge of the fin 10 after the fin has been formed.

As is indicated in FIGURE 3 of the drawings, the upper edge of the fin 10 is preferably provided with a series of longitudinally spaced transverse openings 21 extending therethrough. This permits the float portion 11 which may be formed of a material commercially known as Styrofoam to be molded directly about the upper edge of the fin 10, the two parts being held together by the portions of the styrofoam extending through the openings 21. As indicated in FIGURE 4 of the drawings, the fin 10 is anchored midway between the lateral sides of the float body. As is indicated in FIGURE 4 of the drawings, the float body 11 includes a generally flat undersurface 22 and a centrally ridged upper surface 23. The side walls 24 of the float body 11 taper upwardly and outwardly from the flat bottom 22 and terminate in outwardly extending ribs 25 which taper in thickness toward the front and rear of the body and which assist in the stabilizing action in the event the fishing kite sinks to this extent. The ribs 25 also assist in holding the fin 10 on a generally vertical keel.

The fin 10 is provided with a generally horizontal slot or aperture 26 extending therethrough, the slot terminating short of the front and rear ends of the fin, and rearwardly of the tapered forward end 27 of the fin. As is indicated in FIGURE 5 of the drawings, a clamping arm 29 fits within the slot 26 and the rear end 30 is integrally hinged at a relatively thin section 31 to the fin 10 at the rear end of the slot 26. As will be noted from the position of the section line in FIGURE 3, the section is taken above the major portion of the clamping arm 29 but extends through the hinge portion 30 of this arm so as to indicate the construction. The clamping arm 29 is of slightly shorter length and width than the slot 26 so that the arm may swing from the position illustrated in full lines in FIGURE 5, to the position shown in dotted outline therein.

The clamping blade 29 is provided intermediate its ends with a lateral projecting lug 32 which has a rounded extremity and is designed to provide a fulcrum for a second clamping arm 33. The clamping arm 33 is of approximately the same length as the clamping arm 29 and is provided intermediate its ends with a rounded notch 34 which is designed to accommodate the fulcrum lug 32 to permit the two arms to hinge together or apart. The arms 29 and 33 are provided with opposed inwardly projecting clamping portion 35 and 36 which are designed to clamp the fishing line therebetween. The ends of the clamping arms 29 and 33 are preferably rounded as indicated at 37 and 39.

A clamping bolt 40 extends through an opening 41 in the clamping arm 33, and through generally aligned opening 42 in the arm 29. A spring 43 is interposed between the head of the bolt 40 and a bearing washer 44 encircling the shank of the bolt 40 adjoining the arm 33. An adjustment nut 45 is provided on the end of the bolt 40 by means of which the spring tension of the spring 43 may be adjusted. The spring 43 tends to hold the jaws 35 and 36 in engagement with one another, and also acts to hold the fulcrum 32 engaged in the notch 34. The openings 41 and 42 which accommodate the bolt are of sufficient size to permit the jaws to be sprung apart.

Thus it will be seen that the jaws 29 and 33 form a structure which is similar to a clothespin and which may support a fishing line with adjustable tension so that it will be released when a predetermined pull is exerted thereupon. The head of the bolt 40 is of smaller diameter than the width of the slot 26 so that the adjustment bolt may pass through the slot when the clamping structure is moved from one side of the fin to the other.

As is indicated in FIGURES 4 and 6 of the drawings, the arm 33 is provided on its upper and lower surfaces with a pair of integral flat plates 46 and 47 which extend in opposite directions therefrom. These plates at all times extend through the slot 26 to act as guides for the clamping arms 29 and 33, the clamping arm 29 extending between the plates 46 and 47. FIGURE 6 shows the clamping arm 33 in inverted position, and indicates an upwardly extending shoulder 49 in a spaced upward projection 50 which are actually on the under surface of the plate 46 in the assembled form of the apparatus. The projection 49 is to engage against the fin 10 below the slot 26 to limit the pivotal movement of the arm in one direction. The projection 50 is sufficiently resilient and small to squeeze through the slot 26 but to normally hold the arms from swinging from the position indicated in full lines in FIGURE 5 to the position shown in dotted outline.

As is evident from FIGURES 4 and 5 of the drawings, the plate 47 which forms the upper plate of the clamping arm 33 is provided with an upwardly projecting shoulder 51 and a spaced upwardly projecting detent 52 which serves a similar purpose. The shoulder 51 engages against the fin 10 above the slot 26 to limit pivotal movement of the arms toward the dotted line position, and the detent 52 squeezes through the slot to frictionally hold the arms in this adjusted position.

In operation, the lure or bait is attached to the fish line 54 and the fishing line is unreeled to the desired extent to locate the lure or bait at a predetermined distance from the kite A. At this point, the fish line 54 is wound in the open coils of the spring 13 so that it will be threaded through the spring 13, the portion of the line which extends to the lure or bait extending from the lower end of the spring as indicated in FIGURE 1. The clamping arm 29 is then swung either to one extreme position or to the other, to extend angularly from the body of the device. When in the extreme position, either the shoulder 49 or 51 is in engagement with the fin 10 and the clamping arm is held in angular relation to the fin by the detent 50 or 52 which has been forced through the opening 26.

Pressure is applied to the ends of the levers 29 and 33 to spread apart the clamping jaws 35 and 36. The line 54 is placed between the jaws 35 and 36, and the clamping arms are released so that the line is clamped between the jaws. The pressure urging the jaws together may be regulated by operation of the adjustment screw 40 so that the line will be released from between the jaws when a predetermined pull is experienced on the line.

The kite is then placed on the water on the desired side of the boat, and the fishing line is gradually payed out. As the kite is drawn through the water, it will move laterally from the boat and will exert a pull upon the lure or bait from a point materially spaced in lateral direction from the boat itself.

The fishing kite is designed to serve the purpose of drawing the bait or lure through the water along a path generally parallel to the path of movement of the boat but spaced laterally therefrom. This is of particular advantage where several persons are trolling from a single boat. Another advantage of the arrangement lies in the fact that the lure may be drawn through areas where trolling is usually impossible due to the fact that the water is not navigable. It has been found that the bait may be drawn inwardly of weed beds along the shore line where it is normally impossible to troll.

When a fish takes the bait, a pull is exerted upon the line which is sufficient to disengage the fishing line 54 from between the clamping jaws 35, 36 and the line may be reeled in in the conventional manner. As the line is reeled in, the kite remains on the line due to the fact that the line still passes through the spring 13. However, the kite does not interfere with the reeling of the line, and the fish may be landed in the conventional manner.

In accordance with the patent statutes, I have described the principles of construction and operation of my improvement in Fishing Kite, and while I have endeavored to set forth the best embodiment thereof, I desire to have it understood that changes may be made within the scope of the following claims without departing from the spirit of my invention.

I claim:

1. A fishing kite including an elongated float, a guide fin extending longitudinally of said float and depending therefrom, a pair of relatively pivotal clamping arms extending angularly from said fin, said arms diverging forwardly and outwardly from said fin and including clamping jaws at their forward end between which a fishing line may be clamped, line guide means at the rear of said fin through which said line is freely slidable and cooperating with said clamping arms to guide the float at a substantial angle to the towing line when the float is drawn from a boat.

2. The structure of claim 1 and in which said fin includes a weighted keel along its lower edge.

3. The structure of claim 1 and in which said clamping arms are pivotally supported for movement to either side of said fin.

4. A fishing kite including an elongated buoyant body, a longitudinally extending guide fin depending therefrom, said fin including an elongated generally horizontal aperture, a first clamping arm having its rear end hingedly connected to said fin at an end of said aperture, a second clamping arm hingedly connected intermediate its ends to said first clamping arm, clamping jaws on the forward ends of said clamping arms between which a fishing line may be clamped, a line guide at the rear end of said fin, and means for releasably holding said clamping arms diverging forwardly and outwardly from said fin on either side of said fin.

5. The structure of claim 4 and in which said first clamping arm is integral with said fin and is formed of flexible resilient plastic.

6. The structure of claim 4 and including guide plates above and below said arms and extending generally horizontally through said aperture.

7. The structure of claim 6 and including means on said guide plates for limiting pivotal movement of said arms through said aperture in both directions.

8. A fishing kite including a generally flat guide fin of flexible resilient plastic having an elongated aperture therethrough, an elongated body of foam plastic molded upon an edge of said fin generally parallel to the aperture, a keel attached to a second edge of said fin in parallel spaced relation to said body, a line guide at one end of said fin, a clamping arm integral with said fin and attached thereto along a hinge joint at one end of said aperture, a second clamping hingedly connected intermediate its ends to said first clamping arm, clamping jaws on said arms, means urging said jaws together, and means on said arms limiting the pivotal movement of said arms through said aperture in each direction.

9. The structure of claim 8 and in which said line guide comprises a coil spring having spaced convolutions between which a line may be wound to extend longitudinally through the spring.

References Cited by the Examiner
UNITED STATES PATENTS

| | | | |
|---|---|---|---|
| 360,418 | 4/87 | Clark | 43—44.95 |
| 2,592,441 | 4/52 | Louthan | 43—44.88 |
| 2,798,331 | 7/57 | Westdahl | 43—43.13 |
| 2,933,848 | 4/60 | Tollefson | 43—43.13 |

FOREIGN PATENTS

| | | |
|---|---|---|
| 1,096,724 | 2/55 | France. |
| 609,852 | 10/48 | Great Britain. |

OTHER REFERENCES

Popular Mechanics, September 1949, page 260, "Boat Carries Fishline."

ABRAHAM G. STONE, *Primary Examiner.*

MELVIN D. REIN, *Examiner.*